US007160501B2

(12) United States Patent
Summer

(10) Patent No.: US 7,160,501 B2
(45) Date of Patent: Jan. 9, 2007

(54) METHOD FOR THE SALT-FREE, NON-OXIDIZING REMELTING OF ALUMINIUM

(75) Inventor: Heribert Summer, Graz (AT)

(73) Assignee: Alumonte Technologiefortschritt in Aluminium GmbH, Graz (AT)

(*) Notice: Subject to any disclaimer, the term of this patent is extended or adjusted under 35 U.S.C. 154(b) by 148 days.

(21) Appl. No.: 10/363,913

(22) PCT Filed: Aug. 20, 2001

(86) PCT No.: PCT/AT01/00269

§ 371 (c)(1),
(2), (4) Date: Jul. 7, 2003

(87) PCT Pub. No.: WO02/20859

PCT Pub. Date: Mar. 14, 2002

(65) Prior Publication Data

US 2004/0012129 A1    Jan. 22, 2004

(30) Foreign Application Priority Data

Sep. 8, 2000    (AT)    .............................. A 1533/2000

(51) Int. Cl.
C21B 13/00    (2006.01)
C21B 11/06    (2006.01)
C22B 21/00    (2006.01)

(52) U.S. Cl. ........................................ 266/44; 266/173
(58) Field of Classification Search ................. 266/44, 266/173, 200, 213
See application file for complete search history.

(56) References Cited

U.S. PATENT DOCUMENTS 3,566,091 A    2/1971 Bay et al.
4,040,820 A *  8/1977 Loach et al. ................... 75/672
4,548,651 A   10/1985 Ramsey
5,688,470 A   11/1997 Spoel
6,247,416 B1   6/2001 Beaudoin et al.
6,436,337 B1 * 8/2002 Gross ......................... 266/242

FOREIGN PATENT DOCUMENTS

EP    0 382 378    8/1990
EP    0 962 540    12/1999
EP    1 150 085    10/2001

OTHER PUBLICATIONS

Patent Abstracts of Japan, vol. 1998, No. 5, Apr. 30, 1998.
XP-000680794, New Technologies for Salt Free Recovery, Melting and Recyling of Aluminium and Dross, Foundry Trade Journal, Oct. 1, 1996.

* cited by examiner

Primary Examiner—Scott Kastler
(74) Attorney, Agent, or Firm—Young & Thompson

(57) ABSTRACT

Process and device for saltless, oxidation-free remelting of aluminum, its alloys and of aluminum scrap with miscellaneous impurities, such as combustible oily substances, adherent combustible or noncombustible materials and those with a higher specific weight in a rotating drum (1) with a combustion chamber (4), two supply valves (5, 6) and one burner nozzle (32), in the conventional manner the fuel being natural gas or heating oil, and the oxygen being supplied with air via the supply valve (6) to the combustion chamber (4), using an electronic control an amount of air being metered such that the amount of oxygen supplied with the air corresponds exactly to the stoichiometric ratio for complete combustion of the fuel supplied by the burner nozzle (32).

6 Claims, 4 Drawing Sheets

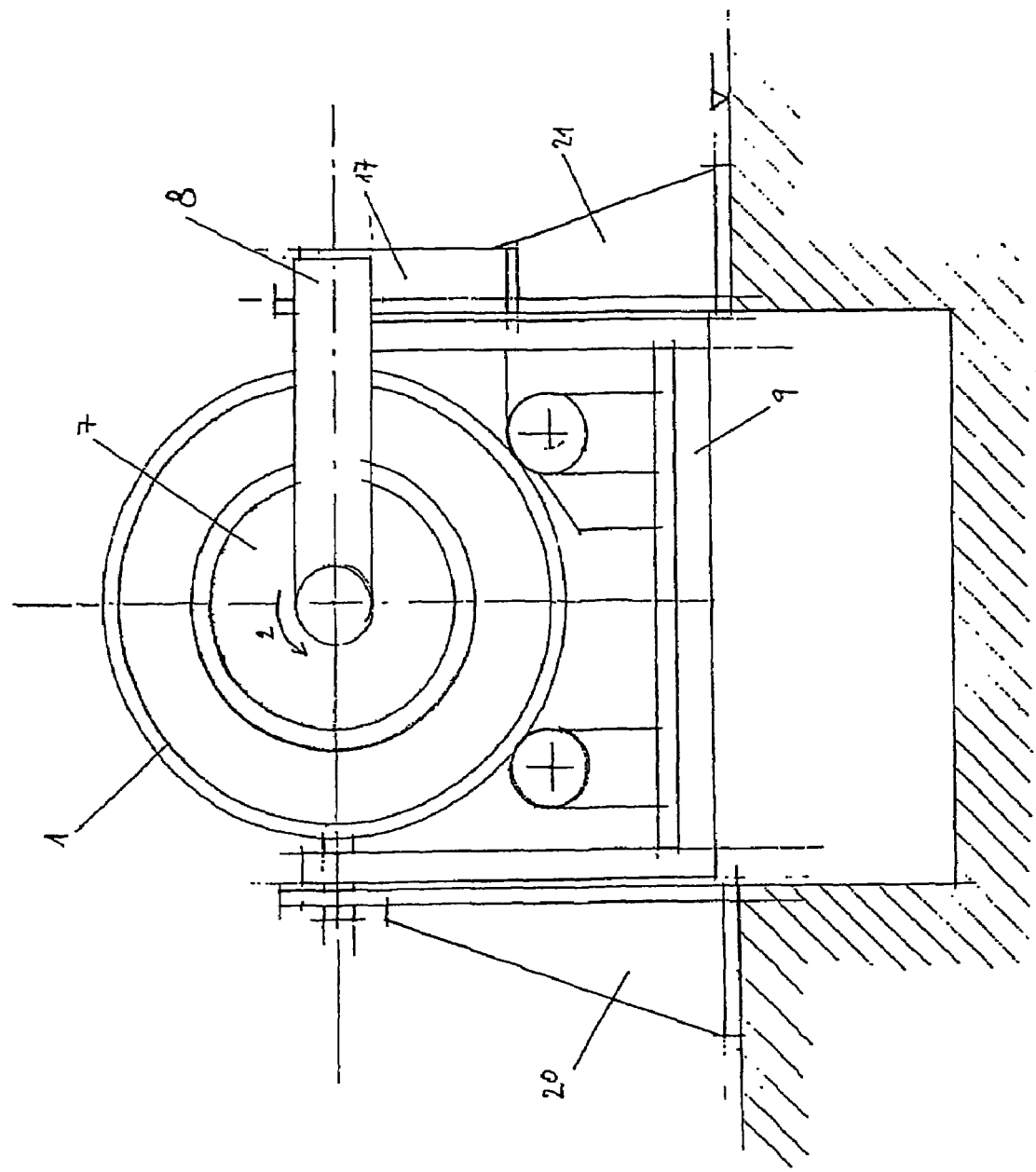

METHOD FOR THE SALT-FREE, NON-OXIDIZING REMELTING OF ALUMINIUM

FIELD OF THE INVENTION

The invention relates to a method for the salt-free, non-oxidizing remelting of aluminum, its alloys and aluminum scrap where this scrap could have impurities from imflammable oily substances, adhering inflammable of non-flammable materials and/or substances which have a higher specific weight.

BACKGROUND OF THE INVENTION

Rotary furnaces or hearth furnaces have been used up to today for the melting of aluminum, its alloys and scraps. Usually natural gas or heating oil (heavy or light) are used as fuels. The necessary oxygen for the fuel is provided in the form of air. Because of the design of these burner systems and the furnaces, there is always enough excess oxygen in the combustion space so that there is quick oxidation of the liquid aluminum. In the language of the forger, "oxidation loss".

To eliminate these undesired oxidation processes, especially in the rotary furnaces, the surface of the liquid aluminum must be protected from oxidation by a covering salt provided especially for this purpose. In the currently known processes, covering salt to the extent of between 7 and 12% of the charge weight is ad mixed into the melt.

The salt melts at such high temperatures (>1,000° C.) and forms a protective layer on the aluminum bath. Subsequently the salt reacts with the oxygen and converts into a loose, partly still exothermic slag. This slag called "scrapings" is eliminated from the furnace and must be temporaily stored on a dump belonging to the plant.

This process has the disadvantage that when the slag is removed it is partly still reacting exothermically and thus presents safety and environmental risks for the surroundings. In addition a good deal of liquid aluminum is trapped in the slag and this can only be reclaimed with much effort. The amount of this can be as much as 80 wt. % of the slag itself.

With the use of this method it is also known that the high temperature of the exothermic salt causes the included aluminum to melt and oxidize further. This leads to additional oxidation loss inside the slag and thus to even more loss, since the amount of recoverable aluminum in the slag decreases. In addition it is known that in the disposal chain between 20 and 25% of the slag is not recyclable and thus is a substantial burden to the environment, requiring storage in a landfill for dangerous waste.

The most important disadvantage to this process is, however, the loss of aluminum by oxidation during melting. The oxidation of the liquid aluminum can be controlled to some extent by using covering salt in the rotary and hearth furnaces, but loss cannot be avoided in the melting process itself since in this case the oxygen leads to the oxidation of the melting aluminum.

The losses range, depending on the charged material, between 1 and 12 wt. %, where pure block material has the lowest loss value and sheet or scrap with a large surface have the highest losses.

OBJECT OF THE INVENTION

The aim of the present invention is, thus, to propose a method which would reduce the disadvantages described above.

SUMMARY OF THE INVENTION

This object has been solved, with the features discussed below. The most important advantage of the proposed method comprises two effects, first oxidation is prevented in both the melting and the already liquid aluminum, and second because of this, no salt is necessary.

This is achieved by excluding all excess oxygen from the combustion chamber, and thus in the furnace, by which the aluminum could be oxidized leading to the high loss due to loss by burning. In addition the loss of aluminum from the inclusions in the slag can be nearly entirely avoided.

Another alternative of the proposed method is that the fuel can be brought to reaction with pure oxygen. This has the advantage that energy loss from the need to heat the inert nitrogen content of the air can be avoided.

In a further design variation, it can be shown to be advantageous that the controlling system creates an overpressure in the combustion chamber which excludes any flow of air into the chamber and therefore there is no additional danger of a possible oxidation of the aluminum.

Furthermore the invention consists of an apparatus to perform the method where the combustion chamber is constructed rotary furnace knownperse. The drum size depends on the rate of melt and the stoechiometric balance between fuel and oxygen.

The combustion chamber, constructed as a rotary furnace, rotates around a central axis and is tilted at a certain angle towards the back where the burner is. The combustion chamber is so designed that at the "back side" there is the burner system with the air and/or oxygen valve and on the "front side" there is a closing lid. Through this opening the material is charged.

An additional feature of the invention is the arrangement of the burner nozzle and a feed valve for air and/or pure oxygen. In this way the combustion oxygen in the form of either air or pure oxygen is blown into the chamber via a semicircular annular valve at an exact distance from the burner nozzle.

Another feature of the invention is the arrangement of a protective baffle shield which is mounted on the closing lid in such a way that on the one hand the measuring instruments behind it are protected from the burner flame, and on the other hand it makes possible the afterburning of the exhaust gases occurring from the melting process by flammable particles which are thrown backwards. In this way the afterburned gases are low on emissions and at the same time energy is won for the combustion process. By positioning the protective baffle shield in the conical area of the feeder opening, an annular gap is created of a size which allows the flow of the exhaust gases that occur when the prescribed operating pressure is maintained.

To maintain a balance of fuel and oxygen so that there is no excess oxygen in the combustion chamber, the oxygen content is constantly measured by a sensor in the combustion chamber. In this way there is an exact dosage of the oxygen for combustion, thanks to the electronic control system.

One other feature of the invention is the design of the control. Here both the balance of oxygen and the melt capacity is monitored. The former is done via the above mentioned sensor, the latter via the amount of fuel flowing in and the temperature of the furnace. The input values are obtained using sensors. A microprocessor with the proper control program calculates the control data necessary and then sets the amount and speed of flow of the fuel and of the oxygen.

There is a further advantage in the fact that there is always an overpressure in the combustion chamber. This occurs because the combustion chamber is sealed air tight at the onset of the process and only after reaching the necessary overpressure in the chamber the closing lid does lift up from the opening enough that the exhaust gases can escape through this annular gap. The opening of the closing lid is controlled by a pressure gauge and a servomotor. That means that with rising speed of combustion the overpressure in the furnace increases and in order to keep the pressure in balance the closing lid is opened by the servomotor.

Another variation is the design of flap valves on the closing lid which open by themselves when a certain overpressure is reached.

The removal of the melted aluminum takes place through a tapping valve on the "back end" of the furnace. Remaining slag and other unburned materials such as iron and steel parts are removed via the "front side" by tilting the furnace.

A further feature of the invention consists of the fact that charging can take place during the combustion process. This can be done by swinging the closing lid away from the furnace opening. In this moment the burner rate is reduced automatically to a level that just prevents an excessive amount of air oxygen from entering. After the lid is closed the oxygen content is measured and the flow of oxygen is first cut back until the balance is restored once again in the furnace between fuel and oxygen.

BRIEF DESCRIPTION OF THE DRAWINGS

In the drawings, the invention is illustrated schematically.

FIG. 2 shows the side view of the closing lid.

DETAILED DESCRIPTION OF THE INVENTION

Figure 1:
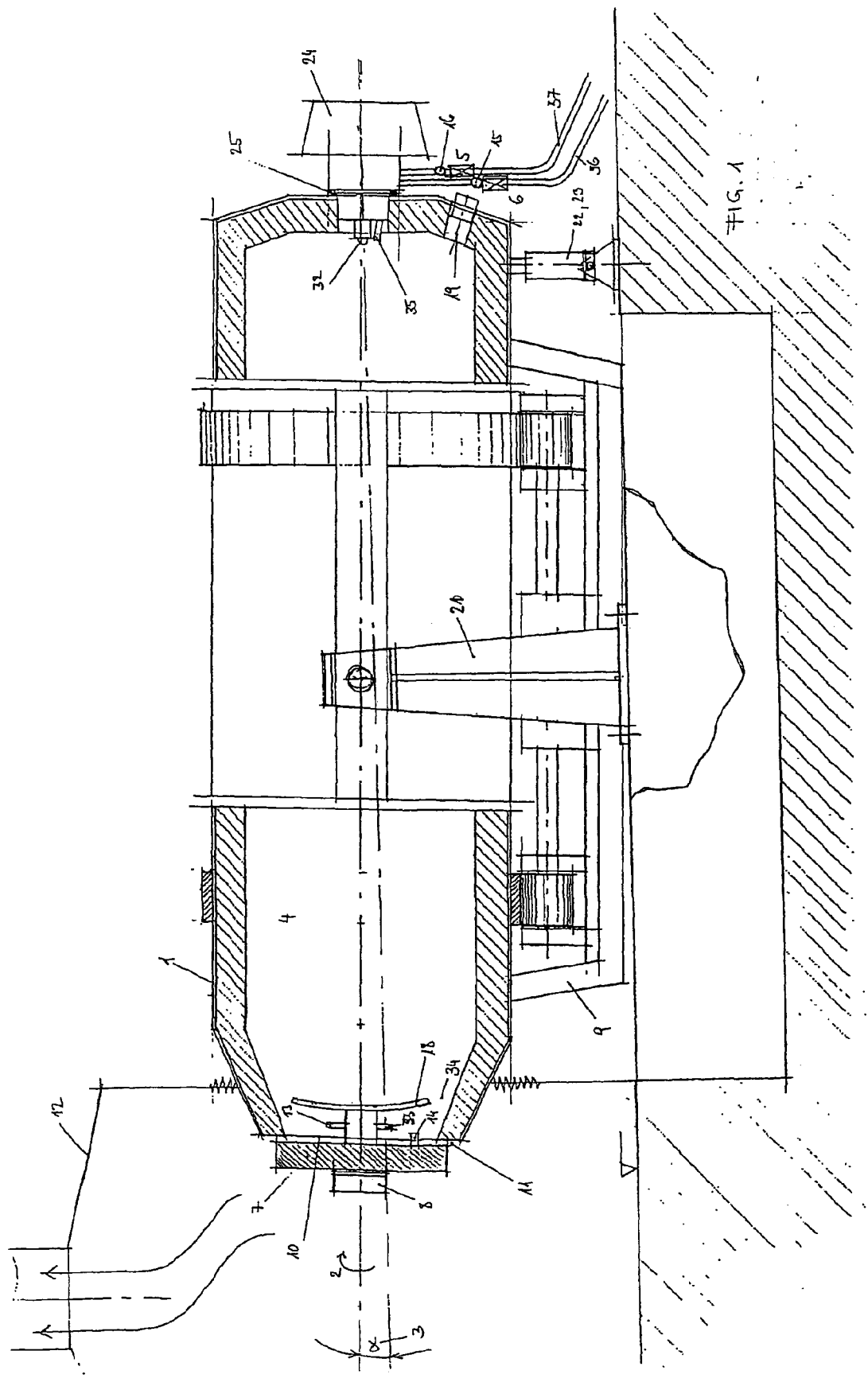
FIG. 1 shows a rotary furnace in a longitudinal section.

The apparatus in accordance with the invention has a steel rotary drum 1, which rotates centered around an axis 2 and is tilted to the angle 3 towards the back. The entire inner side of the rotary furnace 1, the combustion chamber 4, is lined with refractories. The flow of combustion oxygen is carried via the feed valve 5, the introduction of the fuel (natural gas or heating oil) runs via the feed valve 6 to the burner nozzle 32.

The closing lid 7 is connected to the furnace supports 9 by a rod 8 so that the closing lid 7 can close the charging opening 10 independent of the furnace rotation and leave open a predetermined gap 11 for the escape of the exhaust gases. These exhaust gases are pulled up by the exhaust gas hood 12 and transported to the filter plant. To measure the concentration of oxygen in the combustion chamber 4 there is a sensor 13 imbedded in the closing lid 7. In addition there is also a pressure gauge 14 to measure the overpressure in the combustion chamber 4 as well as a temperature sensor 33 built in. Besides, the amount and speed of inflow of the fuel is measured via the sensors 15 and the amount and speed of inflow of air and/or oxygen via the sensor 16.

The closing lid 7 is tilted horizontally by the rod 8 with the help of the servomotor 17, so that the gap which is necessary to regulate the overpressure can be adjusted. Besides, the closing lid 7 has a protective baffle shield 18 which extents into the combustion chamber 4.

At the end of the melting process the rotary furnace 1 is emptied via the tapping valve 19 so that the entire amount of liquid aluminum can be poured out of the furnace into a transport vessel.

After the tapping of the furnace the rotary drum 1 is tilted on the two support blocks 20 and 21 with the help of the hydraulic cylinders 22 and 23 so that the impurities and residue slag can be removed via the charging opening. After that there can be a new charge of material to be melted through the charging opening 10.

To avoid the rotating of the burner 24 with the furnace, the burner is equipped with a bearing 25 by which it is able to be turned. At the same time this bearing is air tight.

Figure 4:
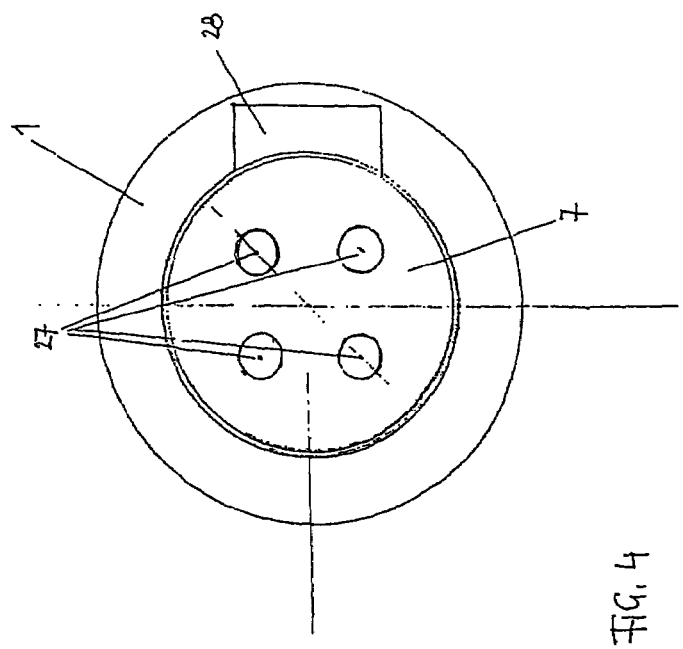
FIGS. 3 and 4 show the variation relating to the invention with exhaust valves 27 which open upon reaching a certain overpressure.
Figure 3:
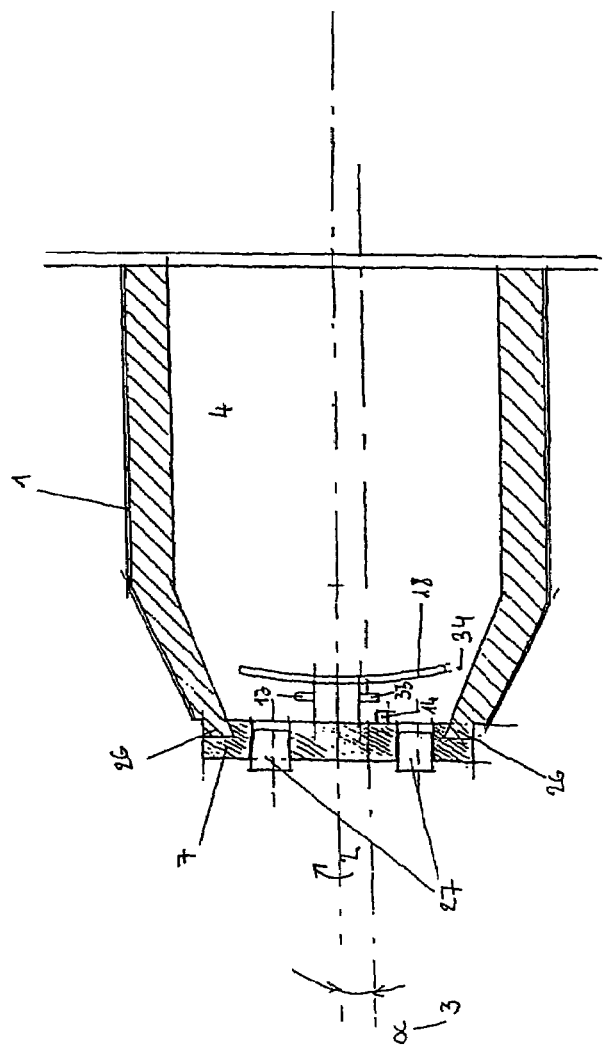

A further variation of the closing lid 7 is shown in FIGS. 3 and 4. Here the closing lid 7 is closed so tightly with the rotating drum 1 by means of a skew notch 26 that there is no gap between the rotating drum 1 and the closing lid 7. The combustion chamber is thus air-tight. The closing lid 7 has four exhaust valves 27, which open according to the overpressure in the combustion chamber 4 and thus carry the exhaust gases away into the hood 12. Thanks to a high-temperature bearing 28, the closing lid 7 does not come into contact with the furnace supports 9 and therefore can be rotated with the rotating drum 1.

Figure 5:
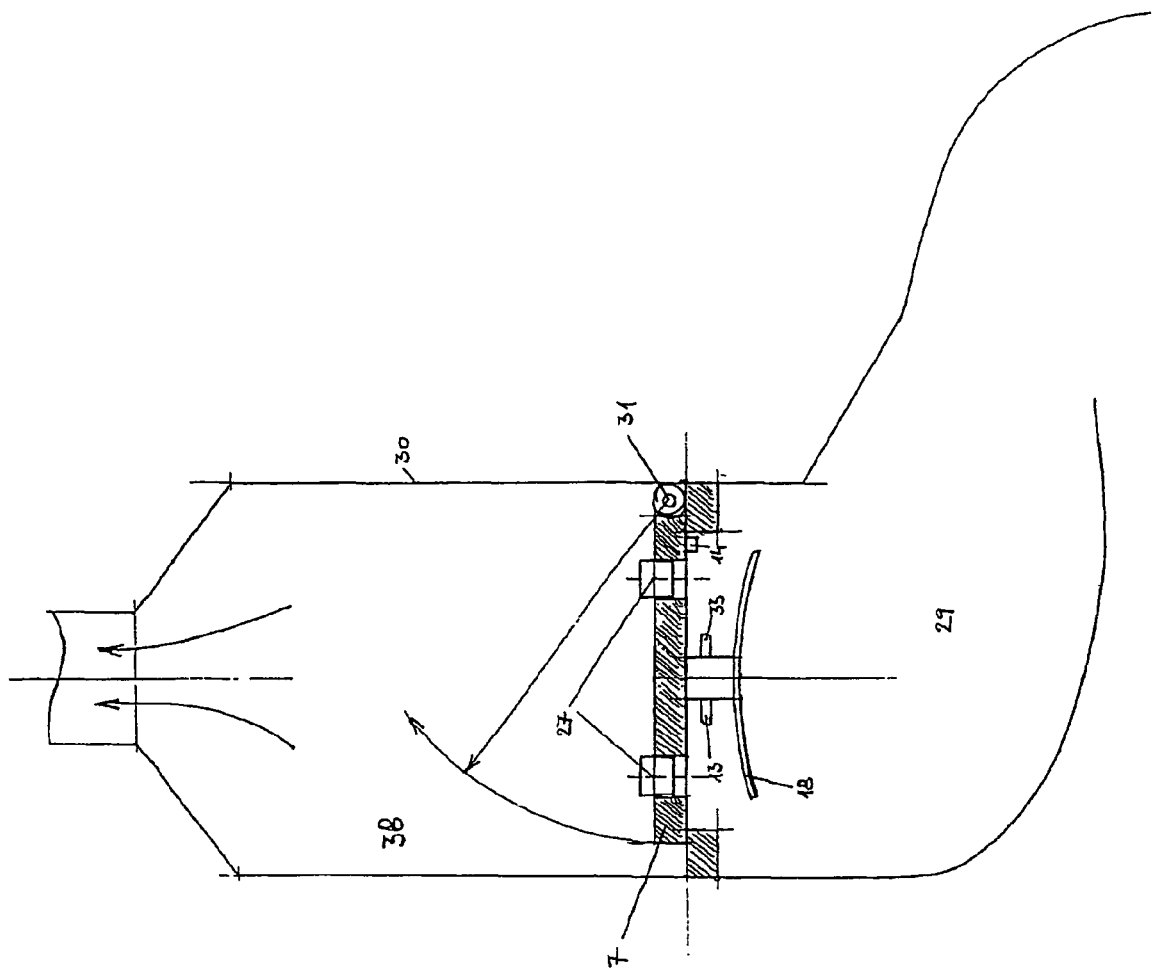
FIG. 5 shows a modified embodiment of the furnace.

An additional variation of the application of the closing lid 7 is shown in FIG. 5. Here the combustion chamber 29 of a shaft furnace 30 is closed air-tight. The closing lid 7 is swung open by means of a bearing 31 so that the shaft 38 can be filled or cleaned from above.

The invention claimed is:

1. Method for the salt-free, non-oxidizing remelting of aluminum, the alloys thereof and aluminum scraps with possible impurities, comprising the steps of:

operating a rotating drum with a combustion chamber, a servo-adjustable closing lid for controlling an overpressure within the combustion chamber with a servo attached thereto for adjusting said closing lid to control the overpressure, feeder valves for fuel and oxygen, a burner nozzle, an oxygen sensor constantly measuring oxygen in the combustion chamber, a temperature sensor measuring furnace temperature, and a pressure gauge measuring pressure within the combustion chamber, wherein natural gas or heating oil are provided as the source of energy and the oxygen is fed along with air through a feeder valve to the burner, and melting aluminum while using an electronic control device to dose an amount of air into the combustion chamber so that the amount of oxygen which is provided by the air corresponds, throughout the melting process, to the stoichiometric ratio for the complete combustion of both the fuel provided through said burner nozzle and the combustible particles of exhaust gases formed during the melting process, wherein, the electronic device uses measurement values from the oxygen sensor, the temperature sensor, and the pressure gauge to control the valves and the servo-adjustable closing lid to adjust i) the oxygen content, ii) the temperature, and iii) the overpressure to maintain said stoichiometric ratio.

2. Method for the salt-free and non-oxidizing melting of aluminum, the alloys thereof and aluminum scrap according to claim 1, characterized in that the fuel is brought to reaction with pure oxygen.

3. Method for the salt-free and non-oxidizing melting of aluminum, the alloys thereof and aluminum scrap according to claim 2, characterized in that an overpressure is produced in the combustion chamber by the. in-flowing oxygen and the fuel via the feeder valves and the burner nozzle together with the combustion process which is controlled electronically.

4. The method of claim 1, wherein,
the oxygen sensor (13) is positioned on the closing lid,
the temperature sensor (33) is positioned on the closing lid (7) on an inside of the combustion chamber (4) to measure the furnace temperature, and
the pressure gauge (14) is mounted on the closing lid (7) to measure the pressure in the combustion chamber (4).

5. The method of claim 1, wherein,
no salt is introduced into the combustion chamber during the melting process, and
the method produces only oxide-free aluminum.

6. Method for the salt-free, non-oxidizing remelting of aluminum, the alloys thereof and aluminum scraps with possible impurities, comprising the steps of:
operating a rotating drum with a combustion chamber, a lid for the combustion chamber with a servo attached thereto for opening and controlling overpressure within the combustion chamber, fuel and oxygen feeder valves, a burner nozzle feeding a burner, oxygen and temperature sensors, and a pressure gauge, one of natural gas and heating oil being provided as fuel through the burner nozzle, and oxygen fed along with air through the oxygen feeder valve to the burner;

while melting aluminum, controlling dosing of air, by an electronic control device, so that an amount of oxygen which is provided by the air corresponds throughout the process to the stoichiometric ratio for complete combustion of both the fuel provided through the burner nozzle and the combustible particles of exhaust gases formed during the melting, wherein the electronic device receives measurement values input from the oxygen and temperature sensors and the pressure gauge and adjusts, by using the valves and the servo-adjustable lid, three parameters of the oxygen content, the temperature, and the overpressure to maintain said stoichiometric ratio such that an equilibrium is maintained where substantially no excess oxygen is present in the combustion chamber and the melted aluminum is free of oxidation.

* * * * *